United States Patent [19]

Ohuchi

[11] Patent Number: 5,473,751
[45] Date of Patent: Dec. 5, 1995

[54] HIGH SPEED PAINT-OUT GRAPHICS DEVICE LSI AND METHOD OF FORMING PAINT-OUT DRAWING

[75] Inventor: Mitsurou Ohuchi, Tokyo, Japan

[73] Assignee: NEC Corporation, Tokyo, Japan

[21] Appl. No.: 59,749

[22] Filed: May 12, 1993

[30] Foreign Application Priority Data

May 13, 1992 [JP] Japan .................................. 4-119445

[51] Int. Cl.$^6$ ................................................. G06F 12/00
[52] U.S. Cl. ............................................. 395/164; 395/162
[58] Field of Search ................................... 395/133, 134, 395/140–143, 162–164; 358/515, 527; 345/185, 197, 203, 133, 24

[56] References Cited

U.S. PATENT DOCUMENTS 5,295,250  3/1994  Komoto et al. .................... 364/DIG. 1
5,327,543  7/1994  Miura et al. ........................ 364/DIG. 1

FOREIGN PATENT DOCUMENTS 01205387  8/1989  Japan ............................... G06F 15/72

*Primary Examiner*—Mark R. Powell
*Assistant Examiner*—Kee M. Tung
*Attorney, Agent, or Firm*—Foley & Lardner

[57] ABSTRACT

A graphics device LSI capable of achieving a high speed paint-out processing, including a pattern reproduction part for forming a duplicate pattern PD of a paint-out pattern, a shift number calculation part for calculating a shift number S from a formation position of a paint-out drawing on an image memory, a paint-out pattern length and a word length, and a data extraction part for extracting paint-out data of the word length by shifting the duplicate pattern PD by the shift number S.

10 Claims, 5 Drawing Sheets

F I G. 2
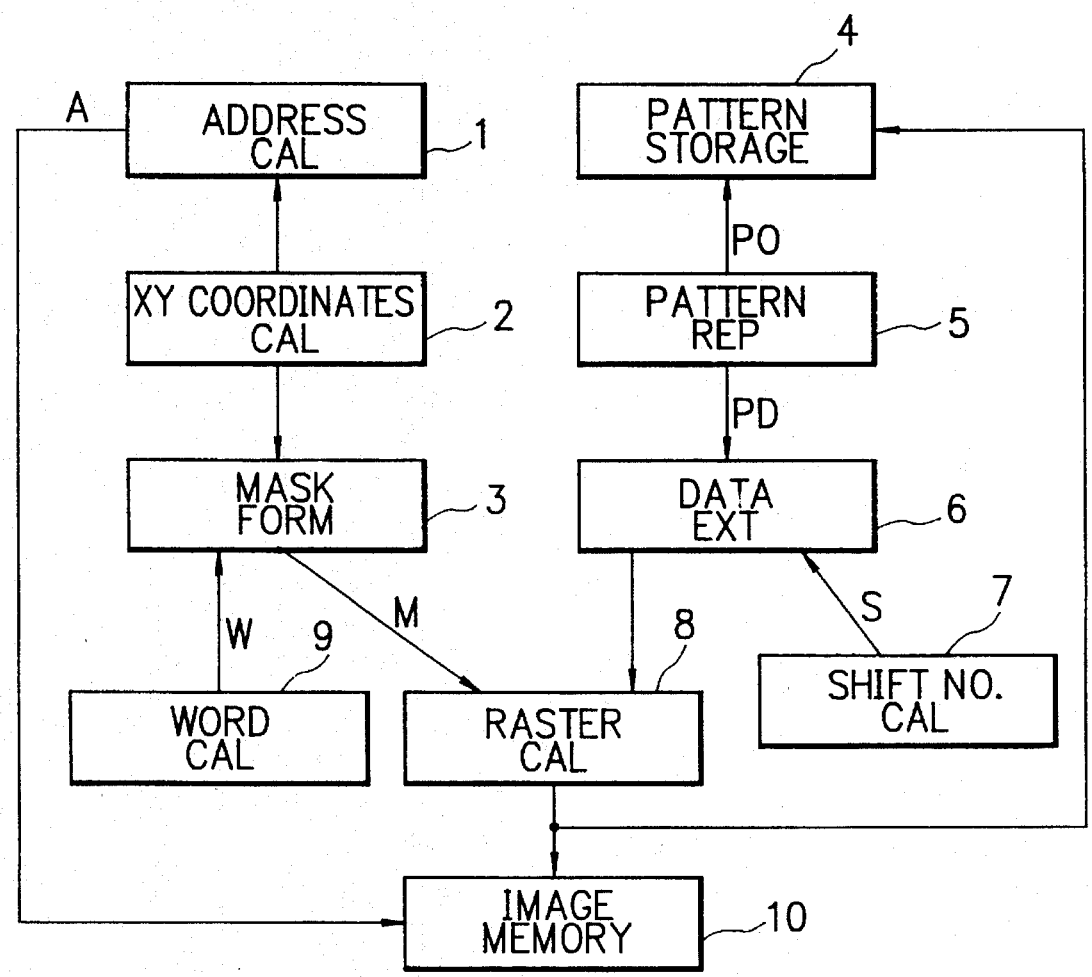

HIGH SPEED PAINT-OUT GRAPHICS DEVICE LSI AND METHOD OF FORMING PAINT-OUT DRAWING

BACKGROUND OF THE INVENTION

The present invention relates to a graphics device LSI, and more particularly to a graphics device LSI capable of processing a paint-out operation at a high speed for use in a graphics system having a function for displaying a paint-out drawing of a certain pattern in a display, monitor, printer or the like of a computer.

Description of the Related Arts

A graphic processing for displaying or printing a drawing in a display, monitor, printer or the like of a computer includes a character or line drawing processing and also a paint-out processing. A paint-out drawing obtained by the paint-out processing is frequently used as a basic drawing for a graph, an illustration or a special effect. As a basic paint-out drawing, a square, a circle, a polygon or the like can be given, and the figure can be painted out with a single color, that is, its inside can be painted out with one color to form a paint-out pattern, or a hatching or shading can be given within the figure.

Conventionally, such a paint-out processing is carried out as follows. That is, first, as to a given figure, coordinate values of its external shape are calculated. For example, in case of a quadrilateral, this can be readily calculated from X- and Y-coordinates of end points of diagonal lines. The paint-out processing of the figure is executed line by line. That is, the processing is advanced in the X-direction every one line, and, when one line processing is finished, move to the next line, that is, advance one in the Y-direction. In this manner, the paint-out processing is roughly divided into two processes such as a coordinate calculation process for calculating the X-coordinates of both ends of an area to be painted out per one line and a paint-out process for actually painting out the paint-out area.

Conventionally, a number of graphics device LSIs wherein these coordinate calculation process and paint-out process are made by hardware means have been developed. In some of these LSIs, a read/write cycle of memory for the graphics is optimized until almost 100% of activity ratio.

As shown in FIG. 1, a conventional graphics device LSI of this kind is comprised of a coordinate calculation part 100 for calculating X- and Y-addresses, an address calculation part 1 for calculating real addresses from the X- and Y-addresses, a data calculation part 102 and an image memory 10. The data calculation part 102 includes a mask formation part 103 for forming mask data, a raster calculation part 104 for controlling bit data not to be processed so as not to be changed, a word calculation part 105 and a pattern register 106 for storing a paint-out pattern.

Next, the operation of the conventional graphics device LSI will now be described.

When a paint-out processing is carried out, the above-described members can operate in parallel and execute internal processings so as to adapt a memory cycle.

First, the X- and Y-addresses are calculated in the coordinate calculation part 100. From the obtained X- and Y-addresses, the real addresses are calculated in the address calculation part 1. At the same time, on the basis of the low-order coordinates of the X- and Y-addresses, the mask data are formed in the mask formation part 103. The mask data determine the bit positions of the processing object in one word every one bit, and the bits outside the processing object are controlled so that their data may not be changed in the raster calculation part 104. The pattern stored in the pattern register 106 is used as the paint-out pattern as it is.

Next, by using the real addresses sent from the address calculation part 1, the image memory 10 is accessed, and the readout data of the image memory 10 and the paint-out data of the pattern register 106 are calculated on reference to the mask data. By rewriting the data of this result into the same addresses in the image memory 10, the inside of the figure is painted out. After finishing the processing for one line, the paint-out pattern of the next line is read out of the predetermined addresses in the image memory 10 and is stored into the pattern register 106.

By the above-described processing, the predetermined paint-out pattern can be formed in the Y-direction, but the paint-out pattern in the X-direction is formed by repeating the same pattern as the word length.

On the other hand, in a recent graphics system, it is required that the word length of the paint-out pattern can be freely selected every one bit unit. Hence, the adaptability to the graphics device LSI as the hardware is not always good. That is, when the above-described processing is carried out, in a software processing of the paint-out processing, the bit length of the paint-out pattern in the X-direction is checked, and by switching a software sequence, an adaptable hardware is used. Thus, this requires a complicated software system.

As described above, in the conventional graphics device LSI, the paint-out pattern in the X-direction is formed by only repeating the same pattern of the fixed word length, and accordingly in the paint-out processing specified by a certain word length of one bit unit, a complicated software system is required. That is, in the software processing, the bit length of the paint-out pattern in the X-direction is checked and the software sequence is switched to use the adaptable hardware. Hence, due to the complicated software processing, it is difficult to execute a high speed operation.

SUMMARY OF THE INVENTION

It is therefore an object of the present invention to provide a graphics device LSI in view of the aforementioned problems of the prior art, which is capable of achieving a high speed operation of a paint-out processing in a graphics processing in a display, a monitor, a printer or the like of a computer.

It is another object of the present invention to provide a method of forming an optional paint-out drawing, which is able to achieve a high speed operation of a paint-out processing in a graphics processing.

In accordance with one aspect of the present invention, there is provided a graphics device LSI for forming an optional paint-out drawing on reference to a paint-out pattern previously determined on a memory to be accessed by a h-bit word length (h: a natural number), comprising pattern storage means for storing the paint-out pattern of an m×n matrix (m, n: natural numbers); pattern reproduction means for forming a duplicate pattern by reproducing a k (m×k≧h) number of the paint-out patterns; shift number calculation means for calculating a shift number from a formation position of the paint-out drawing on the memory, a paint-out pattern length m and the word length h; and data extraction means for extracting paint-out data of the word length h by shifting the paint-out pattern by the shift number.

In accordance with another aspect of the present invention, there is provided a graphics device LSI for forming an optional paint-out drawing on reference to a paint-out pattern previously determined on a memory to be accessed by a h-bit word length (h: a natural number), comprising pattern storage means for storing the paint-out pattern of an m×n matrix (m, n: natural numbers); pattern reproduction means for forming a duplicate pattern by reproducing a k (m×k≧h) number of the paint-out patterns; shift number calculation means for calculating a shift number from a formation position of the paint-out drawing on the memory, a paint-out pattern length m and the word length h; data extraction means for extracting paint-out data of the word length h by shifting the paint-out pattern by the shift number; color storage means for storing color data; and color extension means for extending the paint-out data extracted by the data extraction means to a predetermined bit number to allocate the color data stored in the color storage means to the extended paint-out data every bit.

The data of the duplicate pattern formed in the pattern reproducing means are 16 bits. The extended paint-out data obtained in the color extension means are 8 bits.

The pattern reproduction means is constructed by selection signal lines, input signal lines, output signal lines and transfer gates.

The data extraction means is a barrel shifter.

The shift number calculation means is constructed by a multiplexer, first register, an adder, a second register and a subtracter.

The graphics device LSI can further include color extension means, a foreground register and a background register.

In accordance with another aspect of the present invention, there is provided a method of forming an optional paint-out drawing on reference to a paint-out pattern previously determined on a memory to be accessed by a h-bit word length (h: a natural number), comprising the steps of storing the paint-out pattern of an m×n matrix (m, n: natural numbers), forming a duplicate pattern by reproducing a k (m×k≧h) number of the paint-out patterns, calculating a shift number from a formation position of the paint-out drawing on the memory, a paint-out pattern length m and the word length h, and extracting paint-out data of the word length h by shifting the paint-out pattern by the shift number.

BRIEF DESCRIPTION OF THE DRAWINGS

The objects and features and advantages of the present invention will become more apparent from the consideration of the following detailed description taken in conjunction with the accompanying drawings in which:

FIG. 2 is a block diagram of a first embodiment of a graphics device LSI according to the present invention;

DESCRIPTION OF THE PREFERRED EMBODIMENTS

Figure 1:
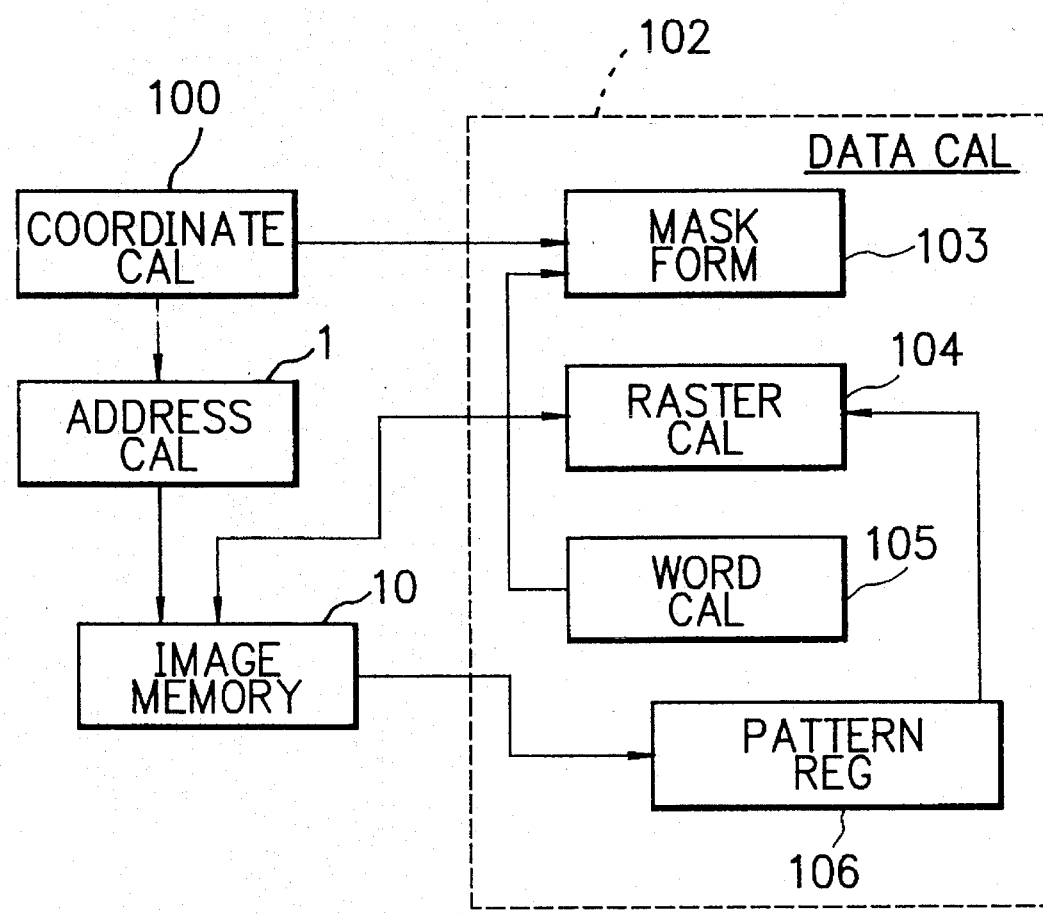
FIG. 1 is a block diagram of a conventional graphics device LSI.

Referring now to the drawings, wherein like reference characters designate like or corresponding parts throughout the views and thus the repeated description thereof can be omitted for brevity, there is shown in FIG. 2 the first embodiment of a graphics device LSI according to the present invention.

As shown in FIG. 2, the graphics device LSI is comprised of an address calculation part 1 for calculating real addresses, an XY coordinate calculation part 2 for calculating X- and Y-addresses, a mask formation part 3 for forming mask data, a pattern storage part 4 as a pattern memory means for storing original pattern data of a paint-out pattern, a pattern reproduction part 5 as a pattern reproducing means, a data extraction part 6 as a data extracting means, a shift number calculation part 7 as a shift number calculating means, a raster calculation part 8, a word calculation part 9 for discriminating which the present word is the first, an intermediate word or the last word, and an image memory 10.

Next, the operation of the above-described graphics device LSI according to the present invention will now be described.

In this embodiment, it is assumed that a word length as a data processing unit is 8 bits. The whole processing is carried out a sequencer (not shown) operated by a microprogram control. In this embodiment, by using a horizontal microprogram, a plurality of instructions corresponding to a plurality of parts can be adapted to be executed at the same time.

First, depending on the result of the XY coordinate calculation part 2, the address calculation part 1 actually calculates the real address A for accessing in the image memory 10. At the same time, the mask formation part 3 forms mask data M. The real address A is obtained by multiplying a word number of a width of a previously defined screen size to the Y-coordinate value and further adding an X-directional word number calculated from the X-coordinate to the multiplied result.

On the other hand, in the mask formation part 3, basically, by using the insignificant 3 bits of the X-coordinate, a mask pattern is formed from the start bit position and the bit length of the paint-out pattern. In this case, concerning the first one word of the paint-out pattern, the right side bits of the start bit position are '1' and the left side bit of the start bit position are '0'. Relating to on and after the second word, all the bits are '1'. In the last word, the high side bits of the end bit position are '0' and the left side bits of the end bit position are '1'. In the word calculation part 9, every one word paint-out of the paint-out pattern, 8 bits are subtracted, and it is discriminated which the present objective word for painting out is the first word, an intermediate word or the last word.

When the last word is detected in the word calculation part 9, the sequencer can know the finish of processing of the one line. Also, a detection output W of the word calculation part 9 is used as control information for forming the mask in the mask formation part 3.

Next, a formation method of a paint-out pattern will now be described. Table 1 shows a duplication of a paint-out pattern, that is, a duplicate pattern PD output from the pattern reproduction part 5 which inputs original pattern data P0 read out of the pattern storage part 4. In Table 1, the original pattern data P0 are 8 bits, and A to H represent pixels of the original patterns and X represents unused data.

TABLE 1

| | Original Pattern Data P0: ABCDEFGH | | | | | | | | | | | | | | |
|---|---|---|---|---|---|---|---|---|---|---|---|---|---|---|---|
| Pattern | Duplicate Pattern P0 | | | | | | | | | | | | | | |
| length | P0 | P1 | P2 | P3 | P4 | P5 | P6 | P7 | P8 | P9 | PA | PB | PC | PD | PE | PF |
| 1 | A | A | A | A | A | A | A | A | X | X | X | X | X | X | X | X |
| 2 | A | B | A | B | A | B | A | B | A | X | X | X | X | X | X | X |
| 3 | A | B | C | A | B | C | A | B | C | A | X | X | X | X | X | X |
| 4 | A | B | C | D | A | B | C | D | A | B | C | X | X | X | X | X |
| 5 | A | B | C | D | E | A | B | C | D | E | A | B | X | X | X | X |
| 6 | A | B | C | D | E | F | A | B | C | D | E | F | A | X | X | X |
| 7 | A | B | C | D | E | F | G | A | B | C | D | E | F | G | X | X |
| 8 | A | B | C | D | E | F | G | H | A | B | C | D | E | F | G | X |

The duplicate pattern PD as the output of the pattern reproduction part 5 is 16 bits and varies depending on the X-directional bit length of the paint-out pattern. For example, as shown in Table 1, in case of one bit length, one bit of the left hand side end pixel "A" of the original pattern data is repeatedly duplicated and output for 8 pixels. In case of two bit length, two bits of left hand side end pixels "AB" are repeatedly duplicated and output 4 times and one pixel "A" is further added for 9 pixels altogether. Similarly, in case of three bit length, three bits of left hand side end pixels "ABC" are repeatedly output 3 times and one pixel "A" is further added for 10 pixels altogether.

As described above, depending on the bit length of the paint-out pattern in the X-direction, an effective data length of the output duplicate pattern PD is varied, and further the maximum 15-bit data is obtained because the bit position for starting the reference is changed depending on the bit position of the writing destination of these data. That is, because in the data extraction part 6, the following processing is performed, that is, the input duplicate pattern PD is shifted to a predetermined bit number and one word of all effective data is taken out from the desired bit position. In other words, by determining the paint-out pattern width to the predetermined bit length, the paint-out start point is not always the head bit of the paint-out pattern data, and hence the duplication is carried out to the maximum 15-bit data so that one word length data can be obtained from any bit position of the above-described pattern.

Figure 3:
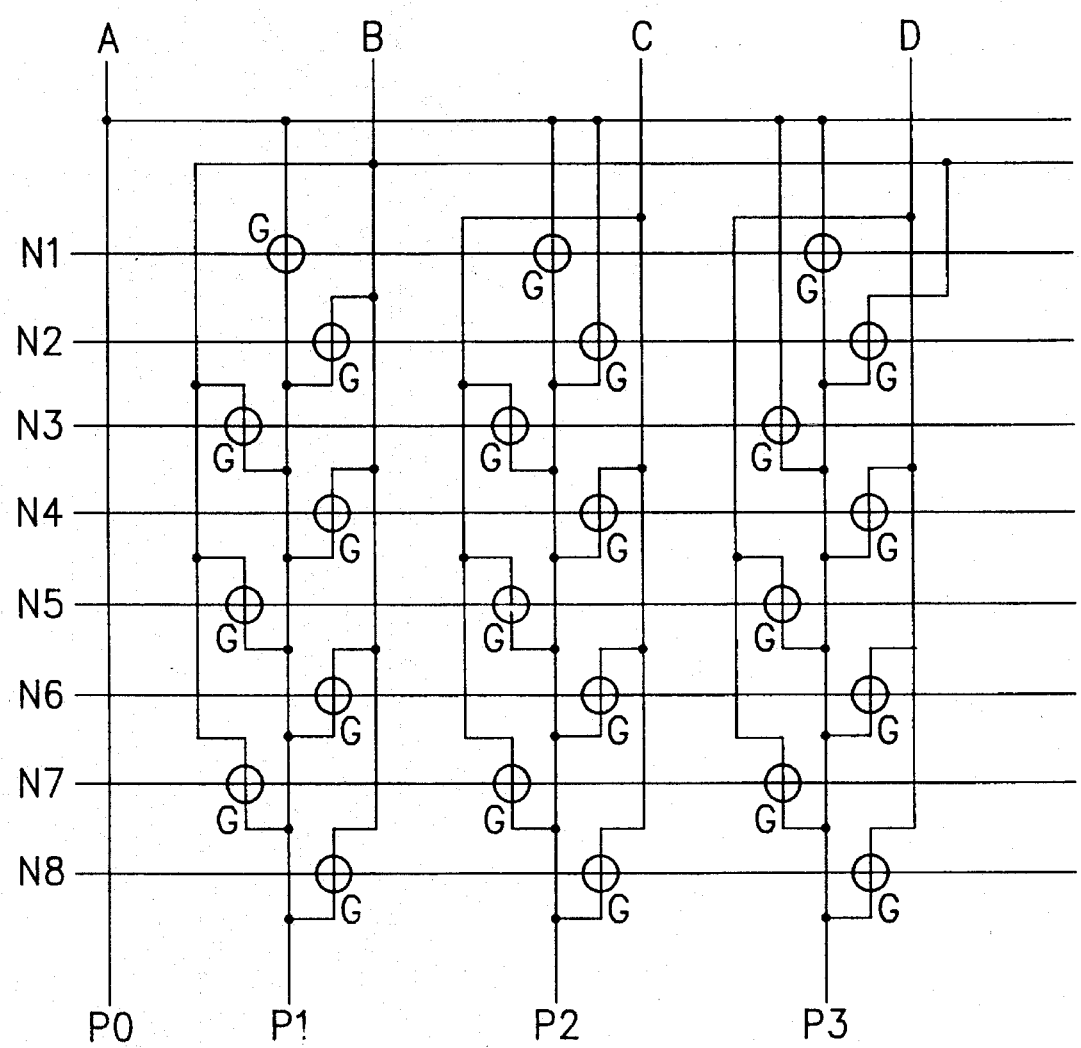
FIG. 3 is a fragmentary circuit diagram of a pattern reproduction part of the graphics device LSI shown in FIG. 2.

FIG. 3 illustrates a part of the circuit of the pattern reproduction part 5. The hardware of the pattern reproduction part 5, as shown in FIG. 3, is a gathering of a plurality of multiplexers (MUXs) and includes selection signal lines N1 to N8, input signal line A to H, and output signal lines P0 to P9 and PA to PF and further a plurality of transfer gates G which are controlled by the selection signal lines N1 to N8 and select the input signal lines A to H or the output signal lines P0 to P9 and PA to PF. Hence, any one of the selection signal lines N1 to N8 is made active by the bit length of the above-described pattern width so as to select which one of the input signal line A to H is connected to one of the output signal lines P0 to P9 and PA to PF. This selection standard complies with Table 1.

Next, the data extraction part 6 is constructed by a barrel shifter to input a shift number S output from the shift number calculation part 7 and to select 8 bits from the 15-bit duplicate pattern PD output from the pattern reproduction part 5.

Figure 4:
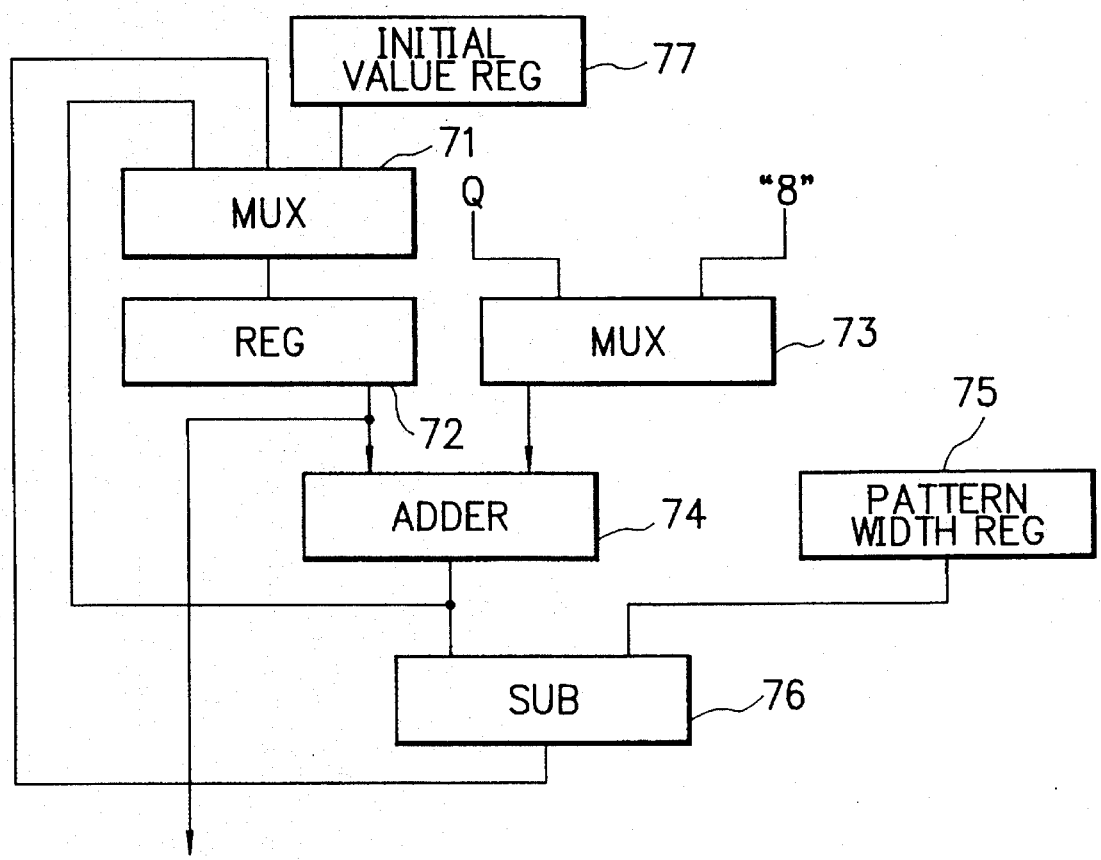
FIG. 4 is a block diagram of a shift number calculation part of the graphics device LSI shown in FIG. 2.

FIG. 4 shows one embodiment of the shift number calculation part 7. As shown in FIG. 4, the shift number calculation part 7 is comprised of multiplexer 71 and 73, a register 72, and adder 74, a pattern width register 75 for storing values of predetermined pattern widths, a subtracter 76 and an initial value register 77 for storing the initial value. An initial value F of a paint-out start bit position of the paint-out pattern is calculated in advance and is stored in the initial value register 77. First, concerning the first word of the paint-out pattern, the value stored in the initial value register 77, that is, the initial value F is the shift number S as it is. That is, the multiplexer 71 outputs the initial value F fed from the initial value register 77 to the register 72 to store the same therein. This value stored in the register 72 becomes the reference start position of the paint-out pattern to be referred to next, that is, the shift number S to be used in the data extraction part 6. Next, after completing the drawing of one word, the shift number S of the next paint-out pattern is calculated as follows. That is, the next word is calculated by adding the paint-out bit number of the first word and the value stored in the register 72 and dividing the addition result by the pattern width to obtain a remainder. Therefore, first, the value stored in the register 72 and the first word remainder bit number Q input via the multiplexer 73 are added in the adder 74 to obtain an addition result K. From this addition result K, the pattern width W stored in the pattern width register 75 is subtracted to obtain a subtraction result D. When the subtraction result D is positive, this subtraction result D is sent to the register 72 via the multiplexer 71 so as to store the subtraction result D in the register 72 as it is. In turn, when the subtraction result D is negative, the addition result K of the adder 74 is fed to the register 72 via the multiplexer 71 so as to store the addition result K in the register 72 as it is. On and after the third time, the value stored in the register 72 and the bit length '8' of one word are added in the adder 74 and the operation is executed in the same manner as described above.

When the paint-out pattern is formed as described above, in the same manner as the conventional case, the image memory 10 is accessed by the real address A calculated in the address calculation part 1 to read out the data, and the data read out of the image memory 10 and the paint-out pattern are calculated on reference to the mask data. The data of these calculation results are rewritten in the same addresses in the image memory 10 to paint out within the figure. After finishing one line of processing, the paint-out pattern of the next line is read out of the predetermined addresses in the image memory 10 and is stored into the pattern storage part 4 as the original pattern data P0.

Next, the second embodiment of the graphics device LSI according to the present invention will now be described in connection with FIG. 5.

Figure 5:
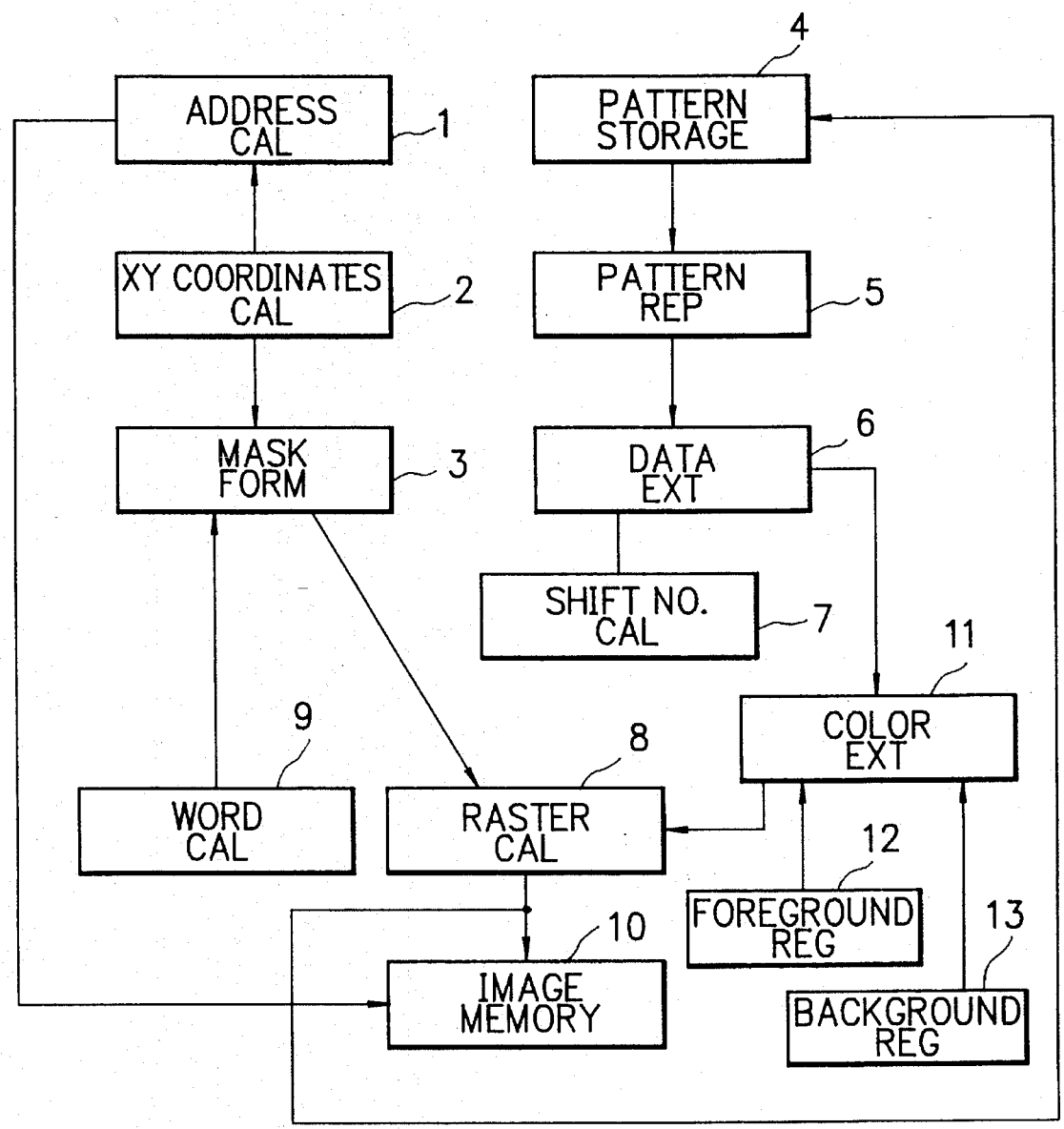
FIG. 5 is a block diagram of a second embodiment of a graphics device LSI according to the present invention.

In FIG. 5, there is shown the second embodiment of a graphics device LSI according to the present invention, having the same construction as the first embodiment shown in FIG. 2, except that a coloring device of the paint-out pattern is further added. That is, the graphics device LSI further includes a color extension part 11, a foreground register 12 and a background register 13.

In the first embodiment described above, the data stored in the pattern storage part 4 represent a two-value image and do not cope with a color pattern. In the second embodiment, by adding the color extension part 11, a color drawing can be performed with respect to the image memory 10.

Next, the operation of this graphics device LSI described above will now be described.

The paint-out data obtained in the same manner as the first embodiment, that is, corresponding to each bit of the output of the data extraction part 6, the contents of the foreground register 12 and the background register 13 are allocated. In this embodiment, the bit lengths of the foreground register 12 and the background register 13 are determined to 4 bits, and 2 bits of the output of the data extraction part 6 are extended to 8 bits in the color extension part 11. The data extended in the color extension part 11 are output to the raster calculation part 8.

In this embodiment, with the extension to the coloring, the operation of the shift number calculation part 7 is somewhat changed. That is, the original pattern data P0 to be processed in one paint-out processing is reduced to 2 bits, and in the calculation of the paint-out pattern reference position after the one word processing, '2' is subtracted in place of '8' of the first embodiment.

As described above, in the graphics device LSI according to the present invention, by providing the pattern reproduction part 5 for reproducing the duplicate pattern of the paint-out pattern, the shift number calculation part 7 for calculating the shift number from the formation position of the paint-out figure in the memory, the paint-out pattern length and the word length, and the data extraction part 6 for extracting the paint-out data of the above-described word length by shifting the above-described duplicate pattern by using the shift number, the paint-out processing on reference to the paint-out pattern of the certain bit length can be executed at a high speed. Further, by providing the color extension part 11, the foreground register 12 and the background register 13, the color paint-out pattern can be obtained.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A graphics device LSI for forming an optional paint-out drawing on reference to a paint-out pattern previously determined on a memory to be accessed by a h-bit word length (h: a natural number), comprising:

pattern storage means for storing the paint-out pattern of an m×n matrix (m, n: natural numbers):

pattern reproduction means for forming a duplicate pattern by reproducing a k (m×k≧h) number of the paint-out patterns;

shift number calculation means for calculating a shift number from a formation position of the paint-out drawing on the memory, a paint-out pattern length m and the word length h:

data extraction means for extracting paint-out data of the word length h by shifting the paint-out pattern by the shift number;

color storage means for storing color data: and color extension means for extending the paint-out data extracted by the data extraction means to a predetermined bit number to allocate the color data stored in the color storage means to the extended paint-out data every bit.

2. The graphics device LSI as claimed in claim 1, wherein data of the duplicate pattern formed in the pattern reproducing means are 16 bits.

3. The graphics device LSI as claimed in claim 1, wherein the extended paint-out data obtained in the color extension means are 8 bits.

4. The graphics device LSI as claimed in claim 1, wherein the pattern reproduction means is constructed by selection signal lines, input signal lines, output signal lines and transfer gates.

5. The graphics device LSI as claimed in claim 1, wherein the data extraction means is a barrel shifter.

6. The graphics device LSI as claimed in claim 1, wherein the shift number calculation means is constructed by a multiplexer, a first register, an adder, a second register and a subtracter.

7. A graphics device LSI for forming an optional paint-out drawing on reference to a paint-out pattern previously determined on a memory to be accessed by a h-bit word length (h: a natural number), comprising:

pattern storage means for storing the paint-out pattern of an m×n matrix (m, n: natural numbers);

pattern reproduction means for forming a duplicate pattern by reproducing a k (m×k≧h) number of the paint-out patterns;

shift number calculation means for calculating a shift number from a formation position of the paint-out drawing on the memory, a paint-out pattern length m and the word length h; and data extraction means for extracting paint-out data of the word length h by shifting the paint-out pattern by the shift number, wherein the pattern reproduction means is constructed by selection signal lines, input signal lines, output signal lines and transfer gates.

8. A method of forming an optional paint-out drawing on reference to a paint-out pattern previously determined on a memory to be accessed by a h-bit word length (h: a natural number), comprising the steps of:

storing the paint-out pattern of an m×n matrix (m, n: natural numbers); forming a duplicate pattern by reproducing a k (m×k≧h) number of the paint-out patterns;

calculating a shift number from a formation position of the paint-out drawing on the memory, a paint-out pattern length m and the word length h;

extracting paint-out data of the word length h by shifting the paint-out pattern by the shift number;

storing color data; and extending the paint-out data extracted to a predetermined bit number to allocate the color data stored to the extended paint-out data every bit.

9. The method as claimed in claim 8, wherein data of the duplicate pattern formed are 16 bits.

10. The method as claimed in claim 3, wherein the extended paint-out data obtained are 8 bits.

* * * * *